United States Patent [19]

Rauh

[11] Patent Number: 4,783,684

[45] Date of Patent: Nov. 8, 1988

[54] COLOR COPYING METHOD AND APPARATUS

[75] Inventor: Hans-Jürgen Rauh, Munich, Fed. Rep. of Germany

[73] Assignee: Agfa-Gevaert Aktiengesellschaft, Leverkusen, Fed. Rep. of Germany

[21] Appl. No.: 123,379

[22] Filed: Nov. 20, 1987

[30] Foreign Application Priority Data

Dec. 5, 1986 [DE] Fed. Rep. of Germany ....... 3641635

[51] Int. Cl.$^4$ ...................... G03B 27/72; G03B 27/76; G03B 27/32
[52] U.S. Cl. ......................................... 355/38; 355/77
[58] Field of Search ........................ 355/32, 35, 38, 77

[56] References Cited

U.S. PATENT DOCUMENTS

| | | | |
|---|---|---|---|
| 3,585,029 | 6/1971 | Neale | 355/77 |
| 3,784,377 | 1/1974 | Levy et al. | 355/77 |
| 3,819,373 | 6/1974 | Sable | 355/35 X |
| 3,937,573 | 2/1976 | Rising | 355/35 X |
| 4,092,067 | 5/1978 | Grossmann | 355/77 |
| 4,152,068 | 5/1979 | Bickl et al. | 355/38 |
| 4,214,834 | 7/1980 | Findeis et al. | 355/38 X |
| 4,244,654 | 1/1981 | Asai et al. | 355/38 X |
| 4,335,956 | 6/1982 | Findeis et al. | 355/77 X |
| 4,566,786 | 1/1986 | Fürsich et al. | 355/77 |
| 4,728,992 | 3/1988 | Vinatzer et al. | 355/35 |

Primary Examiner—Richard A. Wintercorn
Attorney, Agent, or Firm—Peter K. Kontler

[57] ABSTRACT

A color copier has a first station for scanning a colored original in each of the primary colors so as to measure the proportions of such colors in the original. The measurements are sent to a computer which calculates the exposure time in each primary color for reproduction of the original. The copier further has a second station for reproducing the original on any one of several different color copy materials. The spectral sensitivities of the copy materials differ for any given primary color so that the copy materials define a family of sensitivity curves in each primary color. An illuminating device is movable between the two stations and generates the light used for scanning as well as for copying. Thus, the scanning light and copy light have the same spectral composition. The illuminating device carries a separate source of light in each primary color and the emission spectrum of each source projects no higher than the lowest curve of the family of sensitivity curves for the corresponding color.

18 Claims, 2 Drawing Sheets

COLOR COPYING METHOD AND APPARATUS

BACKGROUND OF THE INVENTION

The invention relates generally to copying.

More particularly, the invention relates to a method and apparatus for the reproduction of a colored original.

A known apparatus for the reproduction of a colored original has a measuring unit for determining the proportions of the primary colors red, green and blue in the original. The measuring unit includes three sets of photoelectric cells, and each set is sensitized to one of the primary colors. A respective color filter is disposed in the optical path leading to each set of cells and the transmissivity of each color filter corresponds approximately to the spectral sensitivity of the copy material in the same color. The copying apparatus further comprises a lamp housing containing a source of copy light in each primary color, and a mixing device for the copy light of different color.

The West German Offenlegungsschrift No. 33 17 804 discloses an apparatus which is designed to produce color copies and has separate measuring and copying stations. The spectral sensitivity of the measuring unit is equated to the spectral sensitivity of the copy material with a high degree of precision by appropriate selection of the transmissivities of the measuring unit filters.

There are problems in adjusting the measuring unit filters to the spectral sensitivity of the copy material. On the one hand, it is generally difficult to produce color filters having a predetermined spectral transmissivity curve or function. On the other hand, the spectral sensitivity curves or functions of the various color copy materials on the market can differ so greatly that the filters for the measuring unit must be manufactured to meet the specifications cannot be universally employed but must be manufactured to meet the specifications of a particular type of copy material only. Moreover, the transmissivities of a set of measuring unit filters can change due to external influences such as temperature, dust deposits, etc.

The West German Patent No. 1 214 525 discloses an apparatus for additive color copying. The apparatus includes three sources of copy light each of which is associated with a copying filter designed to pass light in one of the primary colors. The three beams of radiation are simultaneously passed through an original to be copied via a reflector arrangement and the exposures in the three primary colors are begun at the same time. A portion of the radiation which has travelled through the original is deflected towards beam splitters having color filters disposed downstream thereof. After splitting, this portion of the radiation enters a measuring unit which determines the intensity in each of the three primary colors. The radiation emitted by each of the three light sources is then regulated over time in dependence upon the amount of light required for the copying operation.

This known additive copying procedure has the drawback that it is not possible to calculate the required amounts of copy light in advance. Thus, measurement and evaluation of the portion of the radiation used for intensity determination are performed at the time of copying.

OBJECTS AND SUMMARY OF THE INVENTION

It is an object of the invention to provide a copying method which allows a colored original to be reproduced more readily.

Another object of the invention to provide a copying method which enables reproduction of a colored original to be performed more economically.

An additional object of the invention to provide a color copying method which does not require a high precision match between the spectral transmissivity of the color filters and the sensitivity of the copy material being used.

A further object of the invention to provide a copying apparatus which is capable of reproducing a colored original more readily.

It is also an object of the invention to provide a color copying apparatus which makes it possible to obtain close correspondence between the radiation used to scan an original and that used to copy the original.

The preceding objects, as well as others which will become apparent as the description proceeds, are achieved by the invention.

One aspect of the invention resides in a method of copying a colored original on a preselected one of a plurality of different copy materials each having respective spectral sensitivities in the three primary colors which differ from the corresponding spectral sensitivities of the other copy materials so that the copy materials define a family of sensitivity curves in each primary color. The method comprises the step of measuring a characteristic of the original, e.g., the proportions of the primary colors red, green and blue in the original, by directing measuring light at the original. The measuring step may be accomplished, for instance, by passing light through red, green and blue filters each of which is disposed in front of photoelectric cells sensitized to radiation in the respective color. The method further comprises the step of copying the original on the preselected copy material based on the results of the measuring step by directing copy light of each primary color at the original. The copy light in each primary color is directed at the original from a respective source, and the emission spectrum of each source rises no higher than the lowest curve of the family of spectral sensitivity curves for the corresponding primary color.

As indicated above, the measuring step may involve directing measuring light of each primary color at the original, and the spectral distribution of the light for the measuring step is then preferably substantially the same as that of the light for the copying step.

The invention employs an additive copying method. In contrast to the subtractive copying procedure where a wide-band, practically white light source is used, the additive copying method of the invention makes it possible to restrict the spectral width of the copy light. Thus, according to the invention, the emission spectrum of the source of copy light in each primary color projects no higher than the lowest curve of the family of spectral sensitivity curves defined for such color by all of the photographic copy materials which are contemplated for use. It is far simpler to establish the transmissivity of a color filter or filter package such that it lies within the envelope of a large number of curves for all wavelengths for use. It is far simpler to establish the transmissivity of a color filter or filter package such that, for all wavelengths of light, it lies within the envelope of a family of curves than to establish a point-for-point correspondence with a specific spectral sensitivity curve. Aside from the greater ease of manufacture of color filters having a transmissivity lying within the envelope of a family of spectral sensitivity curves, there exists the additional advantage that the filters can be employed for all color copy materials of the family.

Another aspect of the invention resides in an apparatus for copying a colored original. The apparatus comprises a measuring station for measuring a characteristic of the original by directing measuring light at the original. The apparatus further comprises a copying station for reproducing the original on copy material, based on measurements made at the measuring station, by directing copy light at the original. The apparatus also comprises a device for illuminating the original. The illuminating device includes a discrete source of light in each of the three primary colors and is movable between the measuring and copying stations.

The copy station may include mixing means such as a mixing shaft for the light emitted by the illuminating device.

The measuring station may comprise sensing means for determining the proportions of the three primary colors red, green and blue in the original. The sensing means may include a series of photoelectric cells arranged to sense or scan the original region-by-region. The measuring station may further comprise means for conducting the light from the light sources to respective locations of the original.

The apparatus may additionally include a computer which is connected to the sensing means and is designed to calculate the amount of copy light required in each primary color for proper reproduction of the original. Such computer may be arranged to regulate the exposure of the copy material in the copying station.

The apparatus of the invention may be used to carry out the method according to the invention.

By designing the illuminating device to be movable, the invention makes it possible to perform the operation of measuring the original with the same light sources as are used for the copying operation. This enables a correspondence between the measuring light and the copy light to be achieved, that is, the light arriving at the original during the measuring operation may thus have the same spectral composition as the light arriving at the original during the copying operation.

The novel features which are considered as characteristic of the invention are set forth in particular in the appended claims. The improved copying method itself, however, as well as the construction and mode of operation of the improved copying apparatus, together with additional features and advantages thereof, will be best understood upon perusal of the following detailed description of certain specific embodiments when read in conjunction with the accompanying drawings.

DESCRIPTION OF THE PREFERRED EMBODIMENTS

Figure 1:
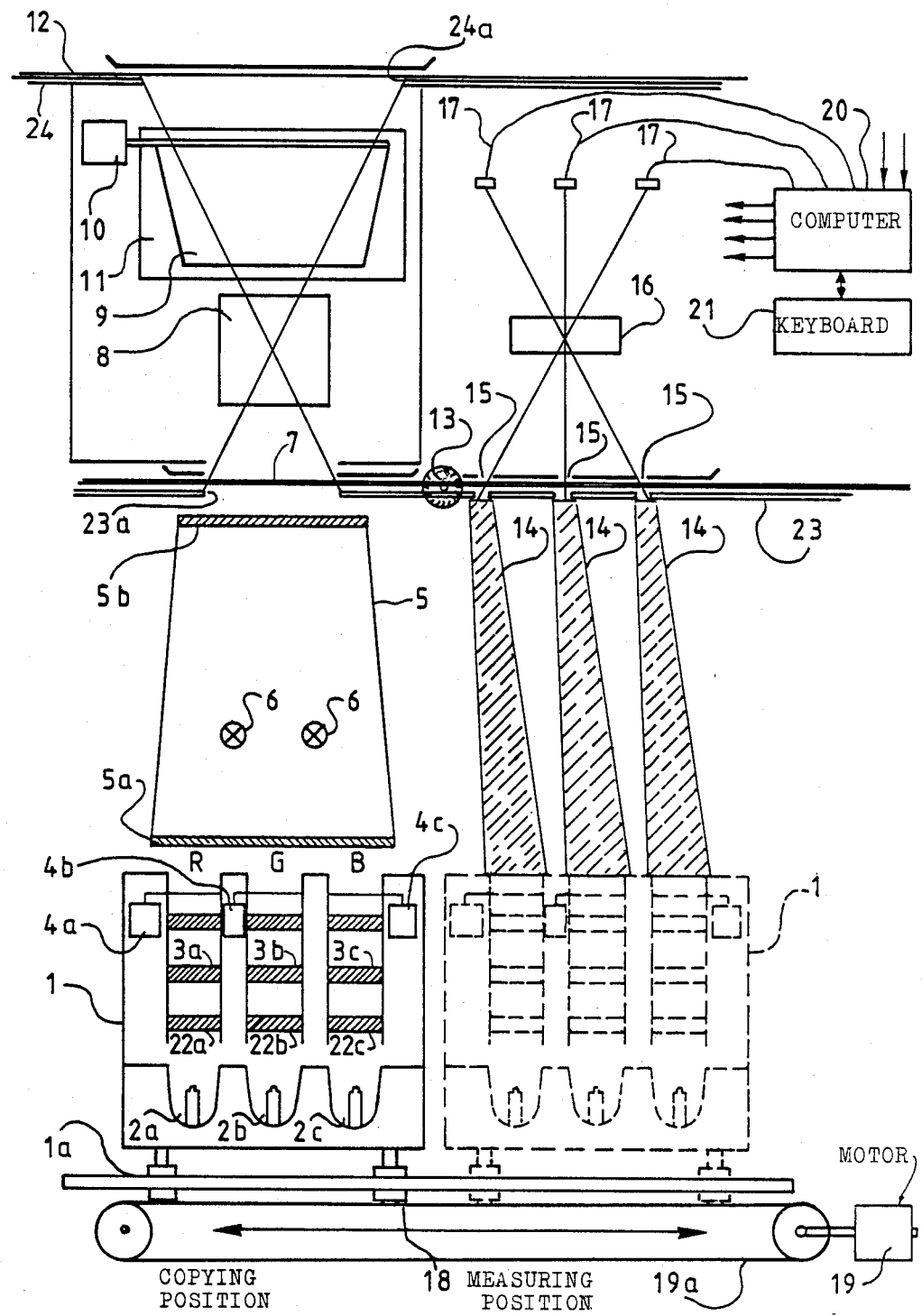
FIG. 1 schematically illustrates a copying apparatus in accordance with the invention.

FIG. 1 illustrates a copying apparatus or copier having a housing 1 which accommodates three identical lamps 2a,2b,2c, e.g., halogen lamps, designed to emit white light. The housing 1 further accommodates three optical paths for the light issuing from the respective lamps 2a,2b,2c. The optical paths include respective dispersion discs 22a,22b,22c; respective additive color filters 3a,3b,3c located behind the dispersion discs 22a,22b,22c; and respective second dispersion discs which have not been identified by reference numerals and are disposed behind the filters 3a,3b,3c. The filters 3a,3b,3c are colored in the additive basic or primary colors red, green and blue and have transmissivity curves to be described later. The optical paths are additionally provided with respective shutters 4a,4b,4c each of which is operated by an electric motor.

The optical path including the filter 3a and dispersion disc 22a constitutes a source R of red light; the optical path including the filter 3b and dispersion disc 22b constitutes a source G of green light; and the optical path including the filter 3c and dispersion disc 22c constitutes a source B of blue light.

The lamp housing 1 is mounted on a guide 1a for movement between two operating positions, namely, a measuring position which is on the right as seen in FIG. 1 and a copying position which is on the left as seen in FIG. 1. The copying position of the housing is shown in full lines while the measuring position of the housing 1 is shown in broken lines. The housing 1 is provided with rollers 18 which engage the guide 1a, and movement of the housing 1 between the copying and measuring positions is effected by means of a motor 19 and an endless belt 19a driven by the motor 19.

A mixing or reflector shaft 5 is disposed above the copying position of the lamp housing 1. The mixing shaft 5 is provided with a first dispersion disc 5a through which the light from the sources R,G,B enters the mixing shaft 5, and a second dispersion disc 5b via which light exits the mixing shaft 5. The mixing shaft 5 functions to uniformly distribute the light from the sources R,G,B so that the light issuing from the mixing shaft 5 has uniform color and intensity distributions.

The mixing shaft 5 is located below a guide 23 for a filmstrip 7 containing a row of colored originals, e.g., color negatives, to be reproduced. The guide 23 is provided with a cutout or window 23a directly above the mixing shaft 5. For a copier of the type illustrated, the margins of the originals in the filmstrip 7 are unnotched. This means that an original to be reproduced is not automatically centered and requires centering once the original is positioned in the window 23a preparatory to reproduction. To this end, the mixing shaft 5 accommodates lamps 6 which are capable of passing light through the original even in the absence of the sources R,G,B in the housing 1.

Above the window 23a in the film guide 23 is an enclosure containing an objective 8 which is followed by a pivotable reflector 9. The reflector 9 is movable between an operative position and an inoperative position by means of a drive shaft which is driven by a motor 10. In the operative position, the reflector 9 is located in the path of the light which issues from the mixing shaft 5 and passes through the objective 8 and makes an angle of 45° with such path, i.e., an angle of 45° with the vertical as seen in FIG. 1. In the inoperative position, the reflector 9 extends vertically and is out of the path of the light exiting the mixing shaft 5.

A guide 24 for a band 12 of photographic color copy material is disposed behind the reflector 9. The guide 24 is provided with a cutout or window 24a which is located in the line of travel of the light passing through the objective 8. The window 24a constitutes an exposure window, and the portion of the band 12 which is to be exposed during the copying operation is framed by the window 24a while the copying operation takes place. When the reflector 9 is in its operative position, the reflector 9 serves as a shutter which prevents light exiting the mixing shaft 5 from impinging upon the portion of the band 12 framed by the exposure window 24a.

The copier has a vertical front wall which is provided with a ground glass plate 11. In its operative position, the reflector 9 causes the image of an original located in the window 23a to be thrown onto the plate 11. This makes it possible to observe and center the image.

A pair of rollers 13 is mounted on or adjacent to the film guide 23 between the measuring and copying positions of the lamp housing 1. The rollers 13 grip an edge of the filmstrip 7, and one of the rollers 13 is connected to a distance measuring device. The distance measuring device may, for example, be in the form of a light barrier including a rotary disc having one or more slots, a source of a light beam on one side of the disc, and a light sensor on the opposite side of the disc arranged to sense the light beam and generate a pulse whenever a slot intersects the line between the source and the sensor. The light sensor of such a light barrier may be connected to a computer 20, e.g., a microprocessor, which counts the pulses generated by the light sensor as the filmstrip 7 is conveyed in a first direction. Each pulse represents a predetermined distance, or a step of predetermined length, and the computer 20 stores the pulse counts for subsequent use in locating the different originals of the filmstrip 7 when the direction of travel of the latter is reversed.

The filmstrip 7 can move from left to right or vice versa as seen in FIG. 1. Above the measuring position of the lamp housing 1, the film guide 23 is provided with three slits 15 which extend at right angles to the direction of travel, and across the width, of the filmstrip 7. The slits 15, which are spaced from one another in the direction of travel of the filmstrip 7 by a distance approximately equal to one-half the length of an original, function as scanning slits. A light conductor 14 extends downwards from each of the slits 15. The light conductors 14 are positioned in such a manner that, when the lamp housing 1 is in the measuring position, each of the light conductors 14 connects the associated slit 15 with a respective light source R,G,B. The light conductors 14 serve to direct the light from each light source R,G,B to a respective slit 15 so that an original overlying the slits 15 is impinged and scanned by light in each of the three primary colors red, green and blue.

An objective 16 is disposed behind the scanning slits 15 and focuses the light passing through the latter on respective sensing devices 17. Each of the sensing devices 17 is sensitized to a different one of the primary colors red, green and blue. The sensing device 17 which is sensitized to red is arranged to receive the light from that scanning slit 15 connected to the red light source R; the sensing device 17 which is sensitized to green is arranged to receive the light from that scanning slit 15 connected to the green light source G; and the sensing device 17 which is sensitized to blue is arranged to receive the light from that scanning slit connected to the blue light source B. Each of the sensing devices 17 includes a row of photoelectric cells which may, for example, extend at right angles to the direction of travel of the filmstrip 7 and traverse the width of the originals. Every cell scans a predetermined region of an original at any given time so that the originals are scanned region-by-region. The filmstrip 7 may be moved along its path of travel as the originals are scanned, and each of the sensing devices 17 may scan an original along a number of rows, e.g., twelve to fourteen rows, as the original is conveyed by the scanning slits 15. Assuming that each of the sensing devices 17 has ten photoelectric cells distributed across the width of the originals, approximately one hundred twenty to one hundred forty measurements are successively obtained for each original in each of the primary colors. These measurements, which are representative of the proportions of the primary colors in an original, are delivered to the computer 20 which is connected to the sensing devices 17. The scanning operation may be performed continuously by moving the filmstrip 7 relative to the scanning slits 15, and the measurements obtained from an original are related to the position of the original in the filmstrip 7 via the pulses generated by the distance measuring device connected to the rollers 13.

The red, green and blue filters 3a, 3b, 3c constituting part of the light sources R,G,B in the lamp housing 1 have respective transmissivity curves which, in accordance with the invention, must satisfy specific criteria. The behavior of the transmissivity curves is illustrated in FIG. 2 using the blue filter 3c as an example.

Figure 2:
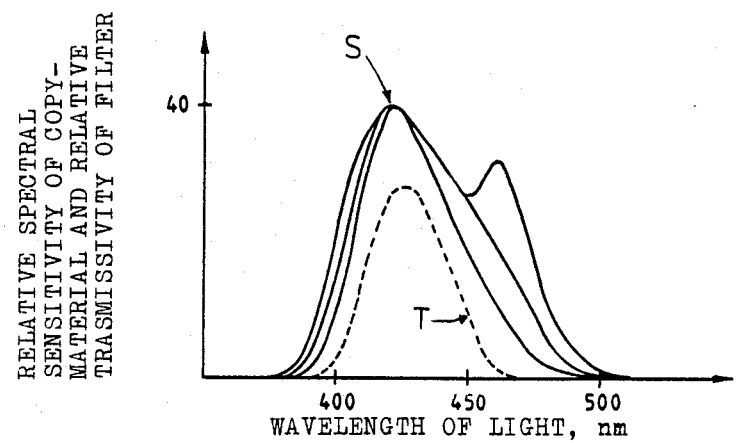
FIG. 2 shows the sensitivity curves for blue radiation of several color copy materials together with the emission spectrum of a blue light source.

FIG. 2 is a plot illustrating the relative spectral sensitivities of different color copy materials in the blue region of the spectrum, as well as the relative transparency or transmissivity of the blue filter 3c. The abscissa in FIG. 2 represents the wavelength of blue light in nanometers while the ordinate represents the relative transparency of the blue filter 3c and the normalized sensitivity of a color copy material to blue radiation. The different color copy materials together define a family of sensitivity curves S for blue radiation. It is immaterial to the invention as to which of the right-hand and left-hand branches of the curves S are associated with one another. Below all of the curves S, which are drawn in full lines, lies a curve T shown in broken lines and representing the relative transmissivity of the blue filter 3c in the lamp housing 1 or, stated differently, the emission spectrum of the blue light source B. In the illustrated embodiment, the transmissivity curve T is spaced from each of the sensitivity curves S at all points by a certain minimum distance. However, it is possible for the transmissivity curve T to extend upwards to the lowest of the sensitivity curves S and, in fact, the transmissivity curve T may be substantially coextensive with such lowest curve. Nevertheless, the transmissivity curve T should not cut and penetrate through any of the sensitivity curves S. Due to the relationship between the transmissivity curve T for the blue filter 3c and the curves S representing the blue sensitivities of the copy materials, the sensitivity of the sensing device 17 which is sensitized to blue radiation is at most equal to the average of the blue spectral sensitivities of the commercially available color copy materials. It is possible to reduce the sensitivity of such sensing device 17 below this average by appropriate design of the blue filter 3c. Although this is accompanied by a reduction in the amount of blue light generated, the difficulties in manufacturing the filter 3c are likewise reduced.

The illustration of FIG. 2 similarly applies to the red filter 3a and the red spectral sensitivities of the copy materials, as well as the green filter 3b and the green spectral sensitivities of the copy materials.

The operation of the copier according to the invention is as follows:

The originals of the filmstrip 7 are first measured or scanned. For this purpose, the lamp housing 1 is moved to the measuring position indicated by broken lines in FIG. 1, i.e., the right-hand position of FIG. 1. This movement is performed by the motor 19 which displaces the lamp housing 1 along the guide 1a. At the same time, the reflector 9 is brought to its operative position in which it prevents exposure of the copy material 12 and causes the image of an original located in the window 23a to be projected onto the ground glass plate 11 for observation. The light required to form and observe the image on the glass plate 11 is delivered by the lamps 6.

The shutters 4a, 4b, 4c are now opened thereby permitting the light from the lamps 2a, 2b, 2c to travel to the scanning slits 15 via the light conductors 14 after the light has been filtered by the color filter system 3a, 3b, 3c. The objective 16 forms an image of each of the scanning slits 15 on the respective sensing device 17. It is not necessary to provide special measuring filters in front of the sensing devices 17 since the desired spectral distribution of the light for the measuring operation is established by the filters 3a, 3b, 3c.

A zero or base value representing a measure of the intensity of the light emitted by the light sources R,G,B of the lamp housing 1 is stored in the computer 20.

The filmstrip 7 is now fed into the guide 23 from left to right as seen in FIG. 1. As the originals constituting part of the filmstrip 7 successively arrive at the window 23a, they are centered. Whenever an original is located in the window 23a, a signal is sent to the computer 20. By then counting the pulses generated by the distance measuring device connected to the rollers 13, the computer 20 is able to establish and store the position of the original in the filmstrip 7 so that the original can be subsequently identified and returned to the window 23a.

The filmstrip 7 continues to be fed into the guide 23 from left to right, and one original after the other is centered on the ground glass plate 11 and evaluated. The distance measuring device connected to the rollers 13 delivers signals representing the positions of the individual originals in the filmstrip 7 to the computer 20. A keyboard 21 connected to the computer 20 allows an operator to prevent further processing of unsatisfactory originals. Upon arrival of the leading original at the scanning slits 15, the computer 20 initiates line-by-line scanning of the originals based on the signals from the distance measuring device. The originals are scanned line-by-line one after the other until the end of the filmstrip 7 has been reached. The computer 20 uses the measurements obtained from the scanning operation to calculate the exposure times for each original in the three primary colors red, green and blue. The calculations may, for example, be performed in accordance with the teachings of the West German patent Application No. P 28 40 287.

Next, the shutters 4a, 4b, 4c are closed; the lamps 6 are extinguished; the lamp housing 1 is moved to the copying position by the motor 19; and the reflector 9 is pivoted out of the optical path into its inoperative position via the motor 10 thereby closing the aperture of the ground glass plate 11 to external light. At this time, exposure of the copy material 12 is prevented by the shutters 4a, 4b, 4c. The direction of travel of the filmstrip 7 is now reversed so that the latter moves from right to left and the originals are returned to the window 23a. It is noted that movement of the filmstrip 7 through the guide 23 may be carried out either manually or automatically, e.g., by designing one or both of the rollers 13 to be motor-driven. When an original arrives at the window 23a, the computer 20 identifies the position of the original in the filmstrip 7. The computer 20 simultaneously transmits the exposure times calculated on the basis of the scanning operation and stored in the computer 20 to the shutters 4a, 4b, 4c to thereby regulate the exposure time in each of the primary colors red, green and blue. By alternating exposure of the originals and advance of the filmstrip 7 from right to left, the originals are copied on the band 12 of copy material one after the other until the end of the filmstrip 7 is reached. Once the last original has been copied, the lamp housing 1 is returned to the measuring position and the copier is ready to accept a new filmstrip.

Since the light sources R,G,B are employed for both scanning and copying of the originals, the spectral composition of the scanning light is the same as that of the copy light.

The light output efficiency when using three separate lamps 2a, 2b, 2c and respective filters 3a, 3b, 3c having transmissivities corresponding to the broken line curve B of FIG. 2 is relatively low. Thus, relatively large amounts of light energy are converted into heat by the three color filters 3a, 3b, 3c. A superior construction from this point of view is illustrated in FIG. 3 where the same reference numerals as in FIG. 1, but with primes, are used to denote similar components.

Figure 3:
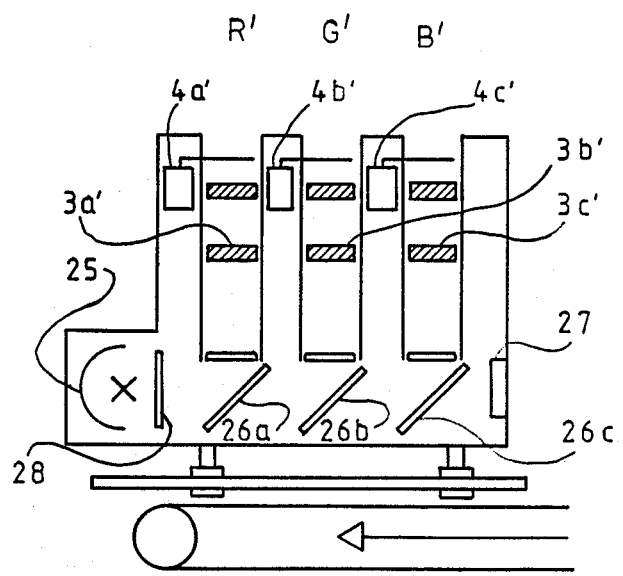
FIG. 3 illustrates another embodiment of an illuminating device constituting part of the apparatus of FIG. 1.

FIG. 3 shows an illuminating device in which the three lamps 2a, 2b, 2c of FIG. 1 are replaced by a single source 25 of white light. A so-called comb filter 28 is disposed behind the source 25 and filters out the interfering wavelengths between the wavelength ranges corresponding to the three primary colors and used for the color copying operation. Following the filter 28 are three dichroic beam splitters 26a, 26b, 26c which are inclined to the horizontal at an angle of 45°. The first beam splitter 26a reflects the red component of the light beam issuing from the source 25 upwards towards the filter 3a' constituting part of the red light source R'. The green and blue components of the light beam pass through the beam splitter 26a unreflected and impinge upon the next beam splitter 26b. The latter reflects the green component of the light beam from the source 25 upwards towards the filter 3b' constituting part of the green light source G'. The blue component of the light beam continues through the beam splitter 26b to the third beam splitter 26c which reflects the blue component upwards towards the filter 3c' constituting part of the blue light source B'.

The thermal component of the light beam from the source 25 travels through all of the beam splitters 26a, 26b, 26c to impinge upon a heat absorber 27.

The filters 3a', 3b', 3c' function to adjust the colored light of the individual light sources R',G',B' so that the emission curves of the sources R',G',B' approximate emission curves which have been matched to all of the spectral sensitivity curves of the copy materials to be employed.

The operation of a copier equipped with the illuminating device of FIG. 3 is the same as that of the copier of FIG. 1.

The single white light source 25 in the lamp housing of FIG. 3 has the same action as the three separate white light sources 2a,2b,2c in the lamp housing of FIG. 1.

If two identical lamp housings are respectively provided in the copying and measuring positions, the copier of FIG. 1 may operate as a high-speed copier without forward and subsequent backward movement of the filmstrip. The computer then stores the exposure times for the three primary colors and, based on the pulses delivered by the distance measuring unit as an original travels from the measuring station to the copying station, transmits the exposure times to the shutters of the copying station lamp housing at the appropriate instant. This can be accomplished by means of a shift register or the use of a suitable memory additional to that of the computer.

The invention allows the color filters employed for scanning and copying of an original to be manufactured relatively economically since the transmissivity curves of the filters need not precisely match the spectral sensitivity curves of a specific copy material. Moreover, the invention makes it possible to use the same filter for a plurality of copy materials.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of copying a colored original on one of a plurality of different copy materials each having respective spectral sensitivities in the three primary colors which differ from the corresponding spectral sensitivities of the other copy materials so that said copy materials define a family of sensitivity curves in each primary color, said method comprising the steps of measuring a characteristic of said original by directing measuring light at said original; and copying said original on said one copy material based on the results of the measuring step by directing copy light of each primary color at said original, the copy light in the different primary colors being directed at said original from respective sources, and the emission spectrum of each source rising no higher than the lowest curve of the family of spectral sensitivity curves for the corresponding primary color.

2. The method of claim 1, wherein the measuring step is performed by directing measuring light of each primary color at said original, the spectral distribution of the light for the measuring step being substantially the same as that of the light for the copying step.

3. The method of claim 1, wherein the measuring step is performed photoelectrically.

4. The method of claim 1, wherein the emission spectrum of at least one source is essentially coextensive with the lowest curve of the corresponding family of spectral sensitivity curves.

5. The method of claim 4, wherein the emission spectrum of each source is essentially coextensive with the lowest curve of the corresponding family of spectral sensitivity curves.

6. The method of claim 1, wherein said sources are used for the measuring step.

7. The method of claim 1, wherein the measuring step is performed region-by-region.

8. An apparatus for copying a colored original, comprising a measuring station for measuring a characteristic of the original by directing measuring light at the original; a copying station for reproducing the original on copy material based on measurements made at said measuring station by directing copy light at the original; and a device for illuminating the original movable between said measuring and copying stations, said device including a discrete source of light in each of the three primary colors.

9. The apparatus of claim 8, wherein said copying station comprises mixing means for the light emitted by said illuminating device.

10. The apparatus of claim 8, wherein said measuring station comprises means for conducting the light from said sources to respective locations of the original.

11. The apparatus of claim 8, wherein said measuring station comprises sensing means for determining the proportions of the primary colors in the original.

12. The apparatus of claim 11, wherein said sensing means is photoelectric.

13. The apparatus of claim 11, wherein said sensing means is designed to sense the original region-by-region.

14. The apparatus of claim 11, further comprising a computer connected with said sensing means and designed to calculate the amount of copy light in each primary color for reproduction of the original, said computer being arranged to regulate exposure of the copy material in said copying station.

15. The apparatus of claim 11, wherein said sensinq means comprises a sensing device for each of the primary colors, each of said sensing devices including a row of cells respectively arranged to sense a preselected region of the original.

16. The apparatus of claim 15, wherein said measuring station further comprises means for directing light from each of said sources to a respective sensing device.

17. The apparatus of claim 16, wherein said directing means comprises a scanning slit associated with each of said sensing devices, at least one objective for focusing light passing through said slits on the corresponding sensing device, and light conductors for conducting light from each of said sources to a respective slit.

18. The apparatus of claim 15, further comprising means for moving the original relative to said sensing devices.

* * * * *